US008882490B2

(12) United States Patent
Felker

(10) Patent No.: US 8,882,490 B2
(45) Date of Patent: Nov. 11, 2014

(54) INSULATED MOLD CAVITY ASSEMBLY AND METHOD FOR GOLF BALL MANUFACTURING

(75) Inventor: David L. Felker, Escondido, CA (US)

(73) Assignee: Just Add Technology Solutions LLC, Escondido, CA (US)

( * ) Notice: Subject to any disclaimer, the term of this patent is extended or adjusted under 35 U.S.C. 154(b) by 332 days.

(21) Appl. No.: 12/897,669

(22) Filed: Oct. 4, 2010

(65) Prior Publication Data

US 2011/0081437 A1    Apr. 7, 2011

Related U.S. Application Data

(60) Provisional application No. 61/248,828, filed on Oct. 5, 2009.

(51) Int. Cl.
 *B29C 45/37* (2006.01)
 *B29C 45/00* (2006.01)
 *B29C 45/14* (2006.01)
 *B29L 31/54* (2006.01)

(52) U.S. Cl.
 CPC ....... *B29C 45/0025* (2013.01); *B29C 45/14819* (2013.01); *B29L 2031/54* (2013.01); *B29C 45/14065* (2013.01)
 USPC ...................................... 425/542

(58) Field of Classification Search
 CPC ...................................... B29C 45/37
 USPC ...................................... 425/524
 See application file for complete search history.

(56) References Cited

U.S. PATENT DOCUMENTS

| 2,361,348 | A | * | 10/1944 | Dickson et al. ............... 264/278 |
| 4,285,901 | A | | 8/1981 | Yotsutsuji et al. |
| 4,552,004 | A | | 11/1985 | Barfield et al. |
| 5,362,226 | A | * | 11/1994 | Kataoka et al. ............... 425/526 |
| 5,407,341 | A | * | 4/1995 | Endo et al. ..................... 425/116 |
| 6,050,803 | A | | 4/2000 | Omura et al. |
| 6,089,847 | A | * | 7/2000 | Inoue et al. .................... 425/116 |
| 6,171,091 | B1 | * | 1/2001 | Bettencourt ................... 425/116 |
| 6,319,451 | B1 | * | 11/2001 | Brune ............................ 264/278 |

FOREIGN PATENT DOCUMENTS

| JP | 06218769 A | 8/1994 |
| JP | 07080848 A | 3/1995 |
| JP | 09011238 A | 1/1997 |
| JP | 2002172655 A | 6/2002 |

OTHER PUBLICATIONS

The Engineering ToolBox, "Thermal Conductivity Coefficients Plastics", http://www.engineeringtoolbox.com/thermal-conductivity-plastics-d_1786.html.*

(Continued)

*Primary Examiner* — Alison Hindenlang
(74) *Attorney, Agent, or Firm* — Procopio, Cory, Hargreaves & Savitch, LLP; Noel C. Gillespie

(57) ABSTRACT

An insulated injection molding cavity assembly for molding a thin or low flow material golf ball cover or mantle layer, comprises a cavity for defining a golf ball layer, the golf ball layer comprising a thickness that corresponds to a space defined by the cavity; a metal surface layer surrounding the cavity, and an insulating layer surrounding the metal surface layer. The metal surface layer thickness is decreased and the insulating layer thickness is increased with decreasing golf ball layer thickness.

37 Claims, 12 Drawing Sheets

(56) References Cited

OTHER PUBLICATIONS

The Engineering ToolBox, "Thermal Conductivity of Metals", http://www.engineeringtoolbox.com/thermal-conductivity-metals-d_858.html.*

International Search Report and Written Opinion issued in related International Application No. PCT/US2010/051366 on Aug. 29, 2011 (12 pages).

Chinese Office Action for Application No. 201080055200.7 dated Apr. 1, 2014.

* cited by examiner

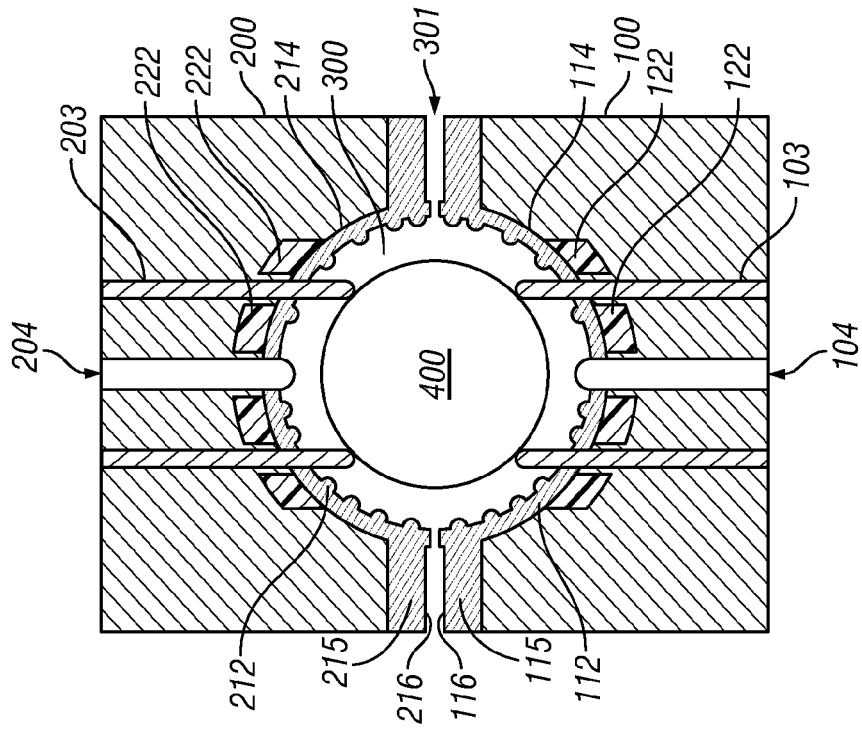
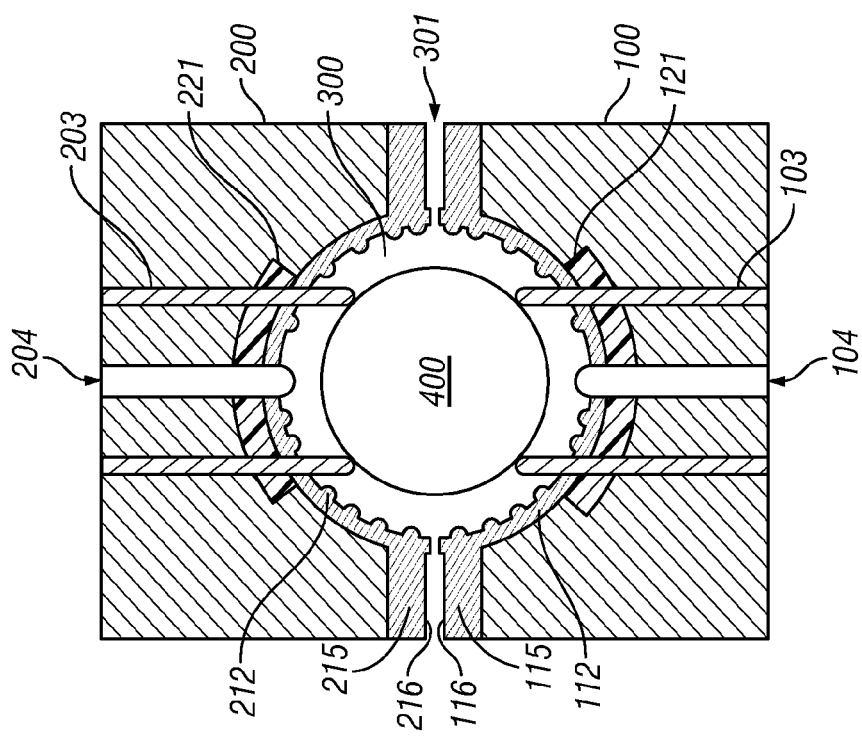

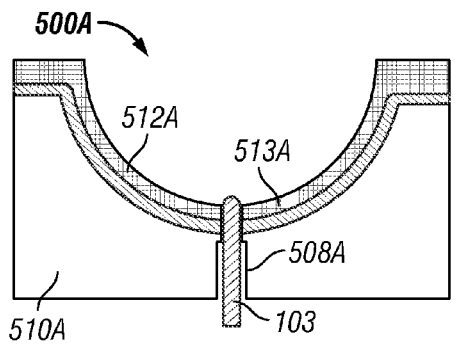
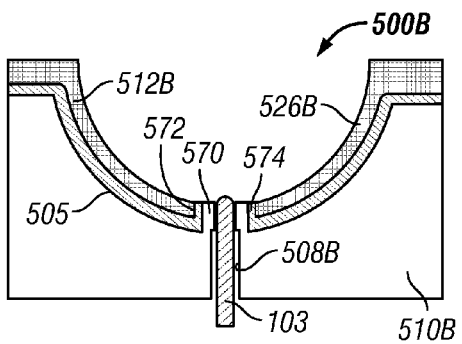
FIG. 17A   FIG. 17B
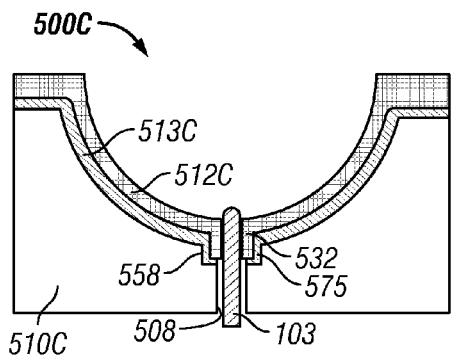
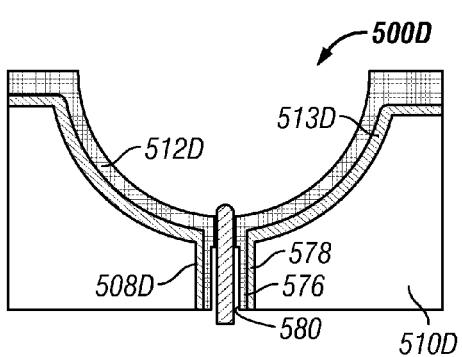
FIG. 17C   FIG. 17D
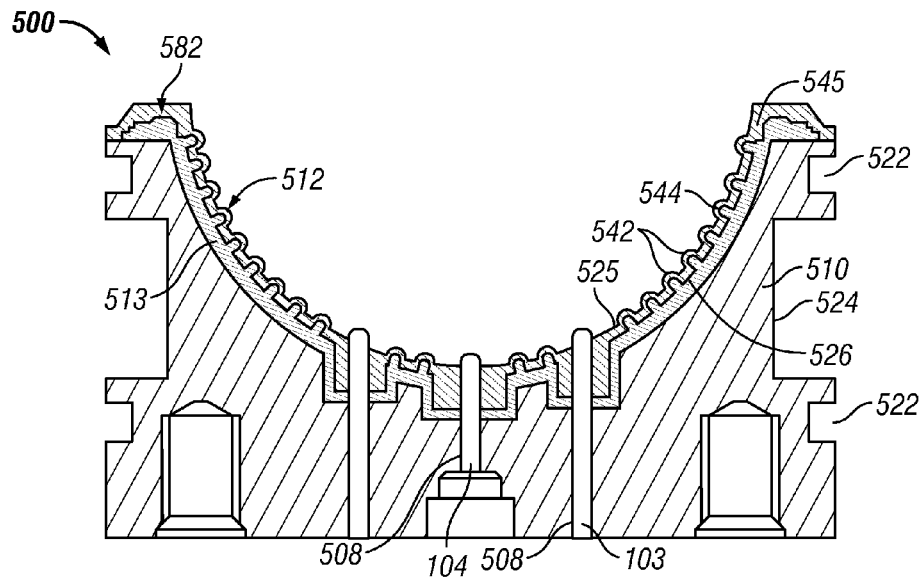
FIG. 18

INSULATED MOLD CAVITY ASSEMBLY AND METHOD FOR GOLF BALL MANUFACTURING

RELATED APPLICATIONS INFORMATION

This application claims priority under 35 U.S.C. §119(e) to U.S. Provisional Patent Application Ser. No. 61/248,828, filed Oct. 5, 2009, and entitled "Insulated Cavity," which is incorporated herein by reference in its entirety as if set forth in full.

BACKGROUND

1. Technical Field

The embodiments described herein relate generally to the manufacture of golf balls, and specifically to a cavity mold assembly for injection molding a golf ball cover on a golf ball, using a layer of insulating material between the metal cavity mold halves and the injection molded material to slow the freezing of the injected material and thus enable a thin cover or a low-flow material cover to be molded before "material freeze-off" occurs.

2. Related Art

Some of the most popular balls in the golf industry have polyurethane covers that are less than 0.035" thick, which is too thin to injection mold easily using standard injection molding cavities. As a result, companies such as Acushnet, Callaway, and Taylor Made often use either a casting or RIM system to apply thin covers to their golf balls. Casting and Reaction Injection Mold (RIM) systems are expensive and very difficult to operate compared to an injection molding system. Injection molded TPU materials are now available that have the toughness of casted or RIM polyurethane; see for example U.S. Pat. No. 7,540,990. However, without the technology to mold thin polyurethane covers, golf ball companies must resort to casting or RIM processes if they want to put a thin polyurethane cover on a golf ball.

Typically golf ball injection molding cavities are made of metal, which is a good conductor of heat. It is difficult to injection mold very thin covers on golf balls using materials such as thermoplastics or thermoplastic elastomers because a point is reached where the heat removal from the injected material by the metal mold is such that the melted material can not fill the mold before "material freezing off" occurs. Even with relatively thick covers, the use of a very low flow material can also have problems with "material freezing off" before the mold can be completely filled.

SUMMARY

An injection molding assembly that enables a thin layer or a low-flow material layer for a golf ball to be molded before "material freeze-off" occurs is described herein.

According to one aspect, an injection molding cavity is provided for molding a thin or a low-flow material cover or mantle layer for a golf ball. The injection molding cavity forms a cavity for defining a golf ball cover or mantle layer, the golf ball layer comprising a thickness that corresponds to a space defined by the cavity; a metal surface layer surrounding the cavity; and an insulating layer surrounding the metal surface layer. The thickness of the insulating layer is selected based on the thickness of the metal layer, which in turn depends on the desired golf ball layer thickness. For a thinner golf ball layer, the metal surface layer is made thinner, and the insulating layer is made thicker to reduce heat loss through the metal layer.

According to another aspect, an injection molding cavity for molding a thin or low flow material layer for a golf ball comprises a cavity for defining an outer surface of a golf ball layer, a metal surface surrounding the cavity, the metal surface comprising a thickness, and an insulating layer at least partially surrounding the metal surface, the insulating layer comprising a plurality of regions located in certain areas relative to the metal surface.

According to still another aspect, an injection molding cavity assembly for molding a thin layer or a low-flow material layer on a golf ball core comprises a cavity for defining a golf ball layer, the golf ball layer comprising a thickness that corresponds to a space defined by the cavity; an insulating layer surrounding the cavity, the insulating layer comprising a thickness; and a metal cavity mold assembly surrounding the insulating layer, the insulating layer having a heat conduction coefficient that is less than a heat conduction coefficient of the metal cavity assembly.

According to another aspect, an injection mold cavity assembly for forming a cover or mantle layer on a golf ball comprises first and second opposing mold halves each having a partial or half cavity in one face which faces the opposing mold half to form a complete cavity configured to receive and enclose a suspended golf ball core in the cavity, whereby a mold cavity is defined between the golf ball core and the cavities in the mold halves, each mold half having a metal surface layer secured in the mold half cavity which has an outer surface facing the mold cavity which is configured to form half of an injecting molding surface for forming the outer surface of a golf ball cover or mantle layer, and an insulating layer extending between the metal surface layer and mold half around at least part of the cavity.

The golf ball core may be a generally spherical, unitary body of one material, such as rubber, plastic, or the like, or may itself have multiple layers, such as one or more mantle layers or a multi-piece rubber or plastic core. The core may be non-spherical in areas. The injection mold cavity assembly may be designed to define a spherical cavity or a cavity which is non-spherical, depending on the desired shape of the golf ball layer being formed. In one embodiment, each half cavity is of hemispherical or substantially hemispherical shape, where the layer of the golf ball is intended to be of uniform thickness. In other embodiments, different insulated cavity assemblies may be provided to form multi-layer balls, with a first assembly for forming a mantle layer and a second assembly for forming an outer cover over the mantle layer, for example. In one embodiment, the half cavities of one cavity assembly may be designed to form a non-spherical cavity for forming a mantle layer (or a cover layer) which is not completely spherical and which is thinner in some regions and thicker in other regions.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 3-9 are cross-sectional diagrams illustrating examples of golf ball injection mold cavity assemblies configured in accordance with various embodiments;

FIGS. 17A to 17D are cross-sectional views illustrating alternative constructions for the core pin and vent pin and the core pin and vent pin receiving bore in one mold half of the injection mold assembly;

FIG. 18 is a cross-sectional view illustrating one embodiment of a mold half assembled from the parts of FIGS. 10 to 15 and forming one half of an injection mold cavity assembly for molding a golf ball cover layer.

DETAILED DESCRIPTION

Certain embodiments as disclosed herein provide for an insulated mold cavity assembly for forming a layer on a golf ball core. The layer may be an inner or mantle layer or a cover or outer layer of a golf ball.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

As used herein, the term "core" refers to any partially formed golf ball on which one or more additional layers are to be formed, such as a one piece or unitary core of rubber, plastic or the like, a multi-piece core, or a core comprising a center part or middle on which one or more mantle layers are already formed. The term "layer" means any layer between the center of a golf ball and the final outer surface of the golf ball, such as the outer cover layer or any intervening mantle or inner layer between the center and outer surface. The term "spherical" or "hemispherical" refers to a completely or substantially spherical or hemispherical surface or layer, and includes a spherical layer with surface patterns of dimples, tubular lattice formations, inverse dimples, or the like as are commonly found on golf balls.

Figure 1:
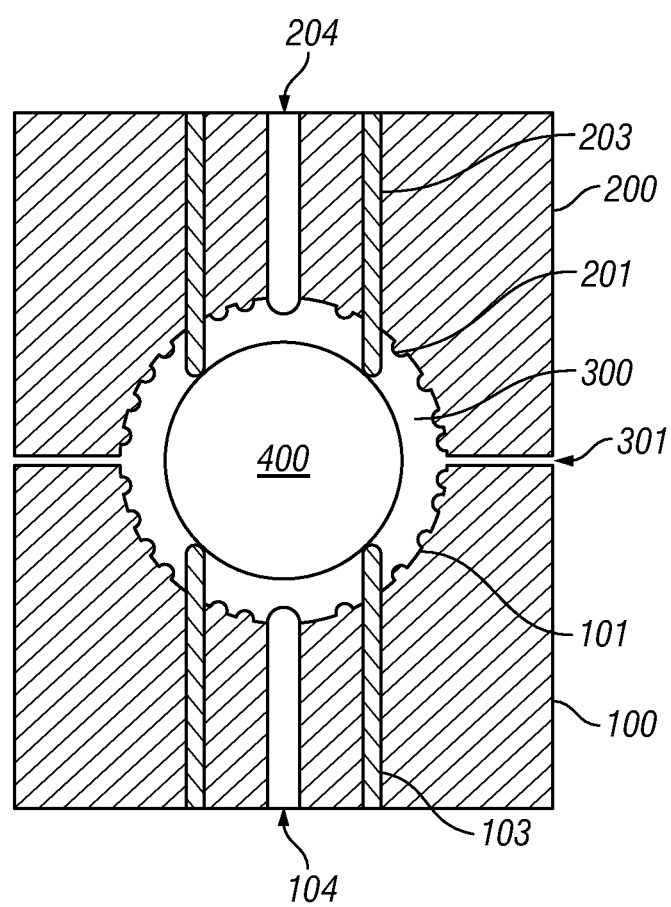
FIG. 1 is a cross-sectional diagram illustrating a conventional golf ball injection mold cavity assembly.

FIG. 1 is a diagram illustrating a conventional golf ball injection mold assembly comprising top mold half 200 and bottom mold half 100 having opposing faces which each have a hemispherical recess, the recesses together defining a mold cavity 300 in which golf ball core 400 is suspended, so as to allow a cover or a mantle layer to be molded in the remainder of the cavity between the ball and top and bottom mold halves. The spherical injecting molding metal surface 101, 201 for forming the outer surface of a golf ball cover layer is shaped to form the desired dimple pattern. As illustrated, the hemispherical cavities have projections or bumps to form the desired golf ball dimple pattern. Golf ball core 400 is suspended in the center of cavity 300 via pins 203 and 103 on top and bottom respectively. Top and bottom vent pins, 204 and 104 respectively, are included to allow for gases from cavity 300 to be evacuated during molding. One or more material injection ports or gates 301 formed by recesses in the opposing faces of the mold halves allow the cover material to be injected into the gap between core 400 and the molding surfaces 101 and 201.

As a material is injected into cavity 300, the cavity temperature is usually below the freezing point of the injected material at the time when the material injection begins. The injected material is usually injected between the spherical core 400, or mantled core, suspended in the center of the cavity 300 and the metal wall 101 and 201 of the injection molding cavity. Heat is drawn from the material by both the metal cavity wall 101 and 201 and the suspended core 400. Since the outside of the suspended core 400 is usually a rather low heat conducting material like rubber or plastic, the heat removal rate from the injected material to the core 400 is usually not nearly as fast as the heat removal rate to the surface 101 and 201 of the metal injection molding cavity.

When molding a very thin layer or when molding a very low flow material, the rate of heat removal from the injected material can be fast enough that the material solidifies before it has a chance to fill the entire cavity space 300 between the metal wall 101 and 201 and the suspended core 400. When this happens, the cover or mantle layer does not fully encase the golf ball core 400 and the resulting part is considered defective.

Conventional attempts to solve the problem of the material freezing-off prematurely include injecting the plastic more quickly into the cavity. However, this only works down to a certain layer thickness, below which the thin injected layer becomes so thin the injection rate of the plastic must be increased to the point the material injection rate or pressure limit of the injection molding machine is exceeded. Or, in other cases where the material injection rate of the injection molding machine is not exceeded, the required injection rate and or injection pressure are such that the forces on the core 400 are such that the core 400 is deformed during the process, or the core 400 is moved off center during the process. In cases where the core 400 is deformed or moved off center, the resulting product is considered defective.

Contrastingly, the embodiments described herein use a layer of insulating material between the metal mold halves surrounding the cavity and the injection molded material to slow the freezing rate of the injected material and thus enable a thin layer or a low-flow material to be molded around a golf ball core before "material freeze-off" occurs.

Figure 3:
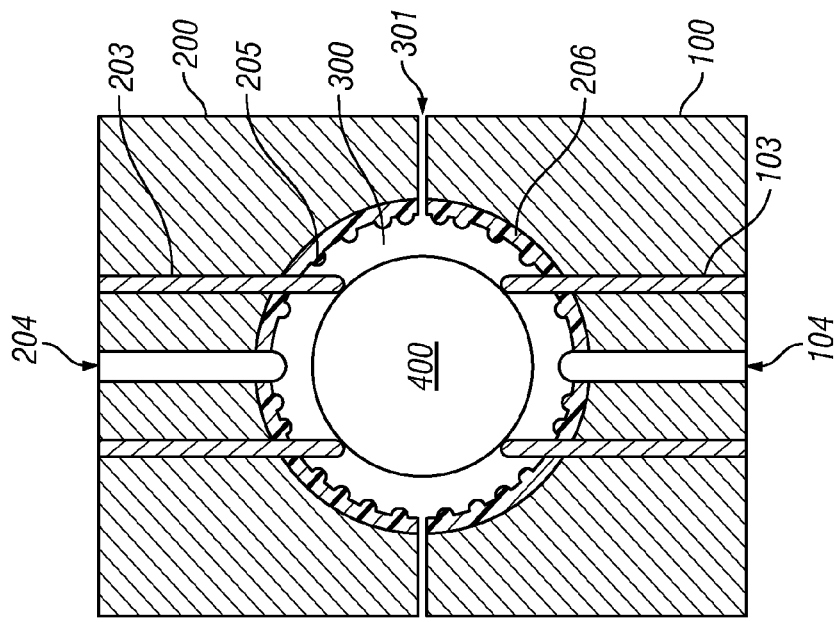

In the embodiment of FIG. 3, the mold surfaces 101, 201 of the mold halves 100, 200 of FIG. 1 are replaced by molding surfaces or layers 205, 206 of insulating material. In the alternative embodiment of FIG. 4, described in more detail below, the metal molding surfaces 101, 201 of FIG. 1 are replaced by relatively thin metal molding layers or half shells 112, 212, respectively, which form the mold surface in cavity 300, and layers 102, 202 of insulating material between each metal layer 112, 212 and the respective metal mold half.

In the prior art injection molding assembly of FIG. 1, as plastic material is injected into a cavity 300 containing a suspended golf ball core 400, when injection molding a golf ball cover or mantle layer, the flowing plastic comes in contact with the metal molding surface 101 and 201 and the core

400. The metal surface 101 is heated by the plastic material. By having an insulating material 205 and 206 as the molding surface, as in the embodiment of FIG. 3, or an insulating material 102 and 202 under a separate metal molding surface layer 112 and 212, as in the embodiment of FIG. 4, the heat removal from the melted plastic through the molding surface is slowed and the temperature of the molten plastic remains above its freezing point for a longer period of time than if no insulating material were present, e.g., below the metal molding surface.

It is not necessary that the insulation layer, e.g., layer 205 and 206 or layer 102 and 202, be so thick and the metal layer, e.g. layer 112, 212, be so thin that they completely prevent any of the molten plastic from solidifying. But the materials and dimensions of the insulating layer 205,206 of FIG. 3 and the combined dimensions of the insulating layer 102, 202 and metal layer 112, 212 of FIG. 4 should be such that it allows the molten plastic material to sufficiently fill the cavity space 300 between the core 400 and surrounding molding surface. In general, the thickness of the two layers 102, 112 and 202, 212 on each side of the mold cavity depends on the desired cover layer thickness or volume. For a relatively thin cover layer, the metal molding surface layer 112, 212 is made thinner so that it absorbs less heat itself, and the insulating layer, e.g., layer 102, 202, is made thicker, since more insulation is desirable when injection molding a thinner cover layer, where material freeze off is a greater concern. Thus, in general, the thickness of the insulating layer increases as the thickness of the metal surface layer defining the outer surface of the mold half cavity decreases.

Thus, the use of an insulated material layer in the injection mold cavity to enable the molding of thin layers as described in the embodiments below is a new approach to enable the molding of thin covers and mantle layers on golf balls, the molding of low flow material golf ball layers, or both.

The insulating layer can be any material that has a heat conduction coefficient that is less than the heat conduction coefficient of the metal molding surface, or than the metal cavity assembly. It can be a metal, plastic, ceramic, glass, liquid or gaseous material or any other type of material or combination of materials as long as it acts as an insulating layer compared to the metal molding surface or the metal cavity assembly.

Figure 2:
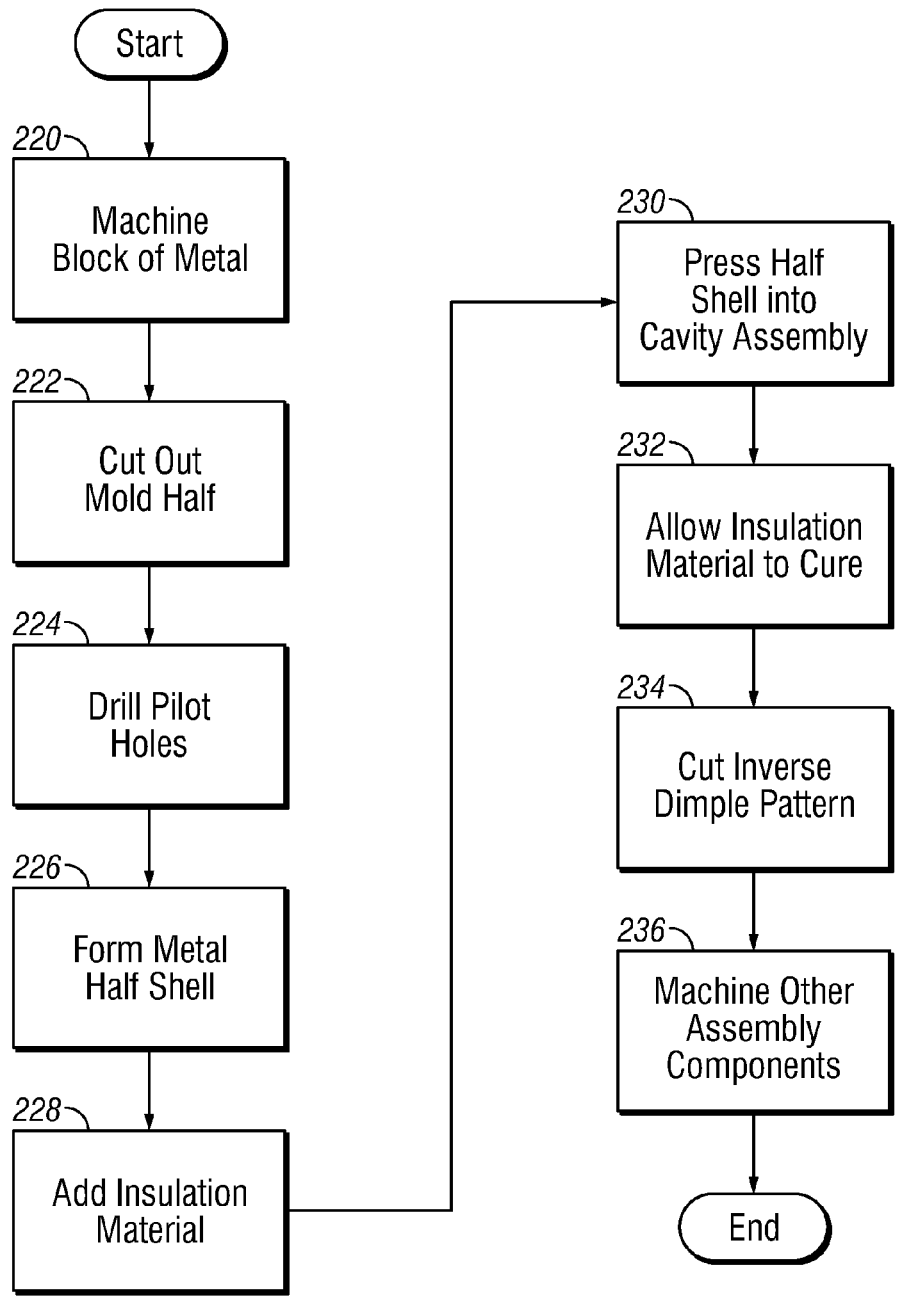
FIG. 2 is a flow chart illustrating an example method for constructing a golf ball injection mold cavity in accordance with one embodiment.

FIG. 2 is a flow chart illustrating an example process for constructing an insulated injection molding cavity that could be used to form the thin cover layer of a golf ball or could be used to injection mold materials with low melt flow characteristics. Although the following description refers to molding of the outer cover layer of a golf ball, the same process may also be used to mold mantle layers onto the golf ball core. First, in step 220, for each half of the mold cavity, a block of metal is machined into the approximate dimensions of the bulk of the cavity assembly. In step 222, each block is cut out to form the desired mold half shape, with the face of the block which opposes the other mold half cut to form the desired hemispherical recess 114, 214, with the dimensions selected such that the recess is larger than the desired cover layer thickness by an amount equal to the selected combined thickness of layers 102,112 or 202, 212. Next, in step 224, pilot holes can be drilled in the mold halves for receiving the vent pins 104, 204. These holes on each mold half will be the point at which the excess insulation material escapes for the case of a polymer insulation material such as an epoxy resin. Pilot holes are also drilled for receiving the core pins 103, 203 which support the golf ball core 400 in the center of the cavity. Core 400 may be a single part core or a multi-piece rubber or plastic core, or may be composed of several layers, such as a central core and one or more mantle layers.

In step 226, a metal half shell or layer is formed for the inner or opposing face of each mold half in the shape of a hemisphere with a peripheral rim. The metal layer in one embodiment is approximately 0.03-0.3" thick and has an outside diameter such that it fits into the cavity 114, 214 with the rim extending over the rim of the cavity in the respective mold half, and allows the proper space for the insulation material to be formed between the mold half and the metal layer or half shell. In alternative embodiments, the thickness of the metal half shell or layer may be less than 0.03 inches, as described below in connection with FIGS. 10 to 18. The shape may be non-hemispherical in some embodiments, where a layer is to be formed which is not completely spherical, i.e. thicker in some regions and thinner in others. The metal shell may be made thicker in some regions, such as around the rim, so as to better withstand the forces during the process of adhering the shell in the mold cavity, as described below in connection with step 230, or may be supported on its outer surface during the adhering process so that it does not deform, particularly where the metal layer is very thin.

In step 228, the insulation material can be added to extend over the hemispherical cavity and outer rim of the recessed faces of the two mold halves. For example, a sufficient amount of a liquid pre-polymer plastic material can be coated over the respective mold half faces, such as a 2-part epoxy.

In step 230, the half shell or metal layer 112 and 114 are pressed onto the respective mold half faces until the hemispherical portion registers into place with the hemispherical cavity in the respective mold face, with a gap between the opposing faces of the metal layer and mold half. In step 232, the polymer material can be allowed to cure in place, and excess polymer material can be trimmed off. Thus, in certain embodiments, the insulating material acts as the adhesive that permanently bonds the half shell to the cavity assembly. In other embodiments, an adhesive can be added to permanently bond the half shell to the cavity assembly. The thickness of the insulating layer may be 0.25 inches or less, and in one embodiment the insulating layer has a thickness in the range from 0.002 to 0.08 inches.

As explained below, the insulating material can comprise a plurality of regions located in specific areas relative to the cavity. In such embodiments, additional steps to pattern or remove the insulating material will also be performed.

Additionally, in many embodiments, there are points of contact between the half shell and the cavity assembly, which act to ensure that the half shell is placed at the correct depth and location in the assembly.

In step 234, e.g., a 5 axis CNC machining device can be used to cut the inverse of the golf ball dimple pattern onto the outer surface of the metal half shell or layer, i.e. the mold surface.

In step 236, the other components of the assembly can be machined into the cavity assembly including: vent pins, gates, core pins, etc.

In certain embodiments, the half shells or metal layers can also have the inverse dimple pattern formed on them before the half shells are inserted into the cavity assembly.

Figure 4:
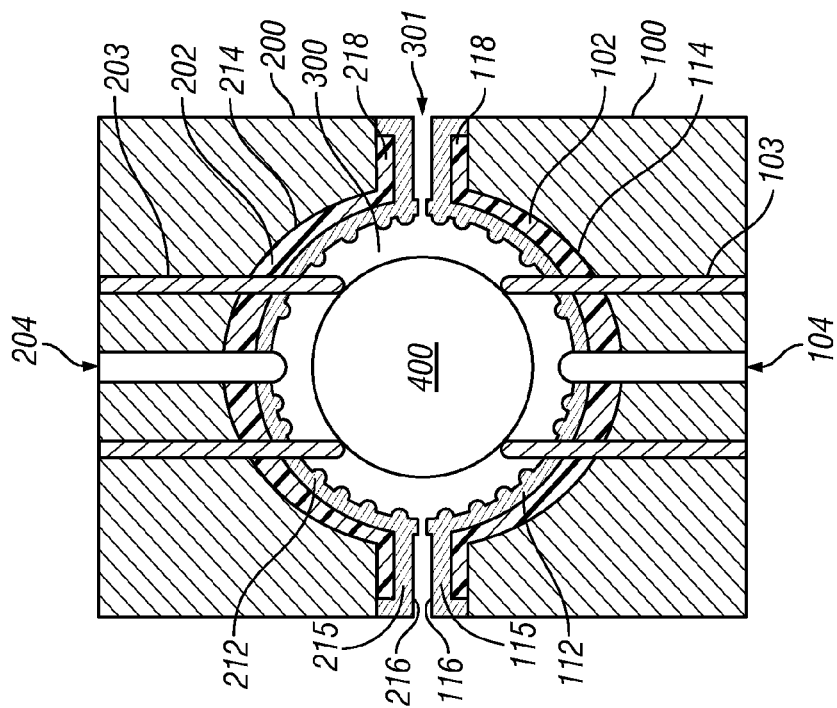

FIGS. 3 to 18 are diagrams illustrating examples of golf ball injection molded cavities configured in accordance with various embodiments. As can be seen, in the embodiment of FIG. 3, the metal mold surface 101 and 201 has been replaced with an insulating material layer 205 and 206. Alternatively, as illustrated in the embodiment of FIG. 4, the insulating layer 102 and 202 is located directly below the metal half shell or layer 112, 212, i.e. between the surface of the metal mold half 100, 200 and the metal half shells or layers 112, 212, respectively. Although the insulating layer 102, 202 is of increasing thickness from the edge to the center of the respective hemispherical cavity in FIG. 4, it may be of uniform thickness in alternative embodiments.

Figure 5:
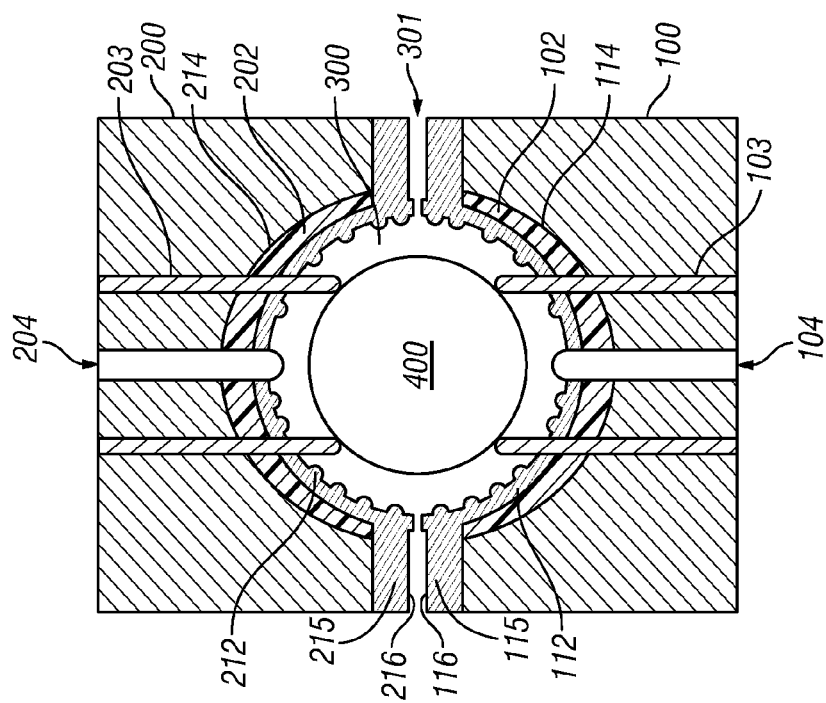

In the embodiment of FIG. 4, the metal surface layers or shells 112, 212 each have outer rims 115, 215 surrounding the hemispherical portions which extend out to cover the rim of the respective mold half, and are formed with opposing hemispherical grooves or recesses 116, 216 which form injection gate regions extending from the hemispherical cavity to the outer edge of the respective shell or layer, forming the injection ports or gates 301, and each insulating layer 102, 202 has a portion 118, 218 which extends under at least part of the injection gate regions at the injection ports 301. The rim of the respective half shells or metal layers 112, 212 may be undercut to receive the extended portions 118, 218 of the insulating layer. In the embodiment of FIG. 5, however, the insulation layer 102, 202 does not extend under the injection gate regions at the rims of the respective half shells 112, 212. The embodiment of FIG. 5 is otherwise identical to that of FIG. 4 and like reference numbers are used for like parts as appropriate.

It is not necessary for the entire cavity 300 to be insulated. For instance, the insulated area could be only that portion that is in the bottom half 100 of the mold, which is the area that is last filled with plastic, or only in the top half 200 of the mold, or in the area around the equator region where the injection gates introduce the plastic material into the cavity.

Figure 6:
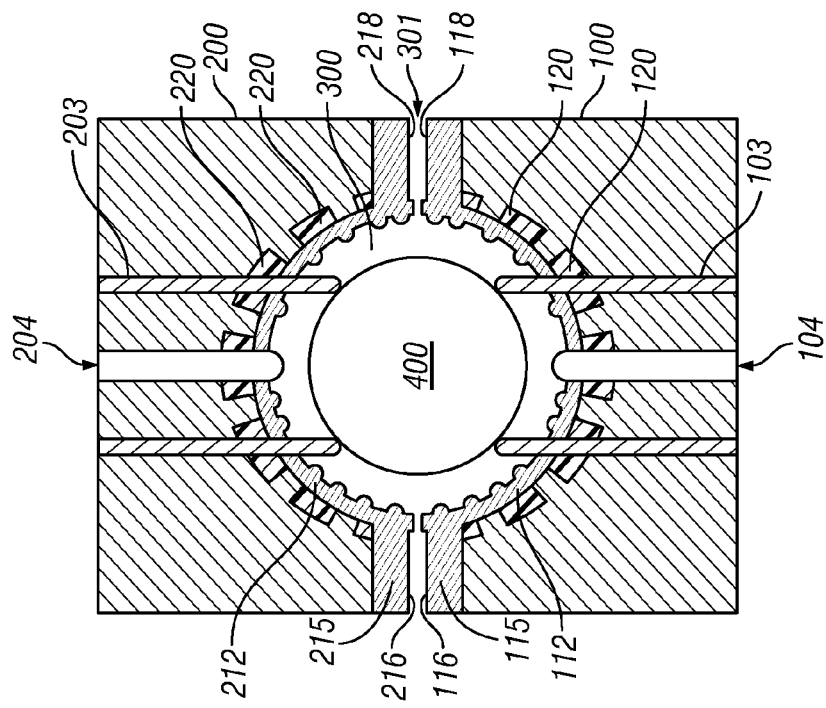

For example, in the embodiment of FIG. 6, the insulated layer between each metal layer 112, 212 forming the cavity and the underlying recess in the metal mold half is broken up and consists of regions 120, 220 of insulated material that reside in some places directly below the metal molding surface or half shell 112, 212, but not below the injection gate regions. In this configuration the mold half 100 and 200 can include projections (not shown) in the areas where the insulation material contacts the molding surface, which can act as a point of registration and/or alignment for the molding surface.

In the embodiment of FIG. 7, continuous arcuate regions 121, 221 of insulation material are provided in the polar region of each half of cavity 300 between metal layers 112, 212 and the underlying surface of the mold half. This can have the effect of keeping the polar regions warmer for a longer period of time and thus helping prevent the cold welds and molding imperfections like "crow's feet" from appearing near the vent pins.

In the embodiment of FIG. 8, separate regions 122, 222 of insulation material are provided in the polar region of each half of cavity 300, as in the previous example, but the insulation regions are confined to different areas. In this embodiment, insulation immediately around the core and vent pins 103 and 203 and 104 and 204 respectively, has been removed so that the pins are enclosed in metal and the insulation regions 122, 222 are spaced from the core and vent pins. This can be important depending on the type of insulation used because often a solvent is injected into the cavity to remove the buildup of volatile solids from the pins. If the solvent contacts an insulation material that was a plastic for instance, it can swell, erode, or breakdown. Having the metal surrounding the pins prevents this interaction.

Figure 9:
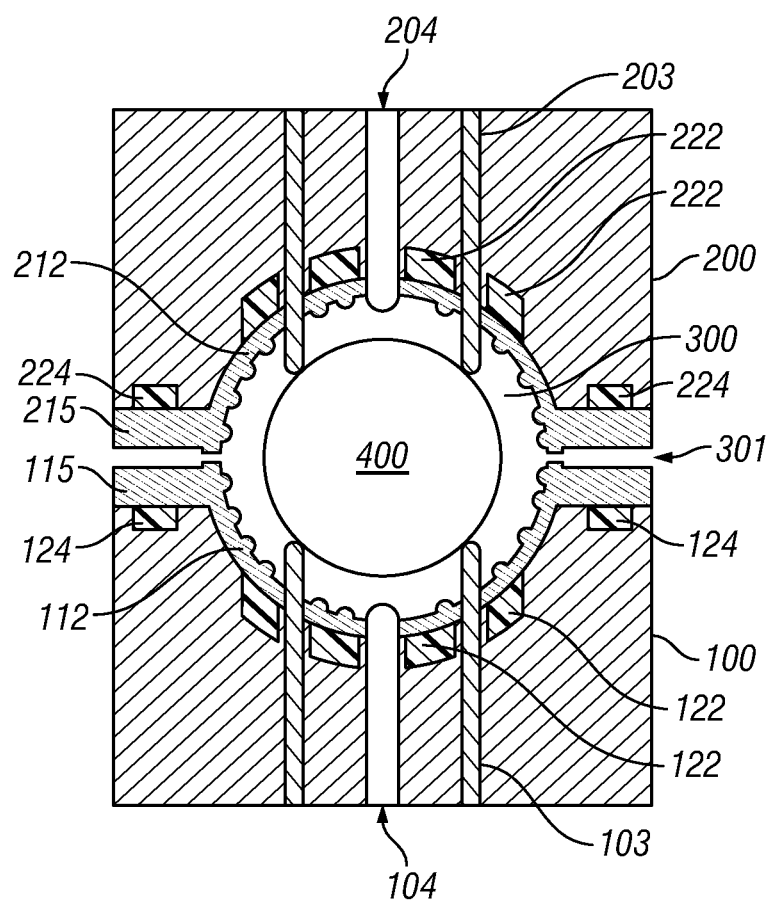

In the embodiment of FIG. 9, regions or portions 122, 222 of insulation material which are spaced from the pins are provided in the polar region of each half of cavity 300, as in FIG. 8, and additional insulation regions 124, 224 are also provided below the rim 115, 215 of each half shell or metal layer 112, 212 in the injection gate areas 301. As in the previous example, the insulation around the core and vent pins 103 and 203 and 104 and 204 respectively, has been removed so that the pins are enclosed in metal. Having insulation material near the injection gates will help prevent polymer heat loss in this area while at the same time allowing the adjacent un-insulated gates and equator region to solidify fairly quickly, preventing excess polymer flash.

Figure 14:
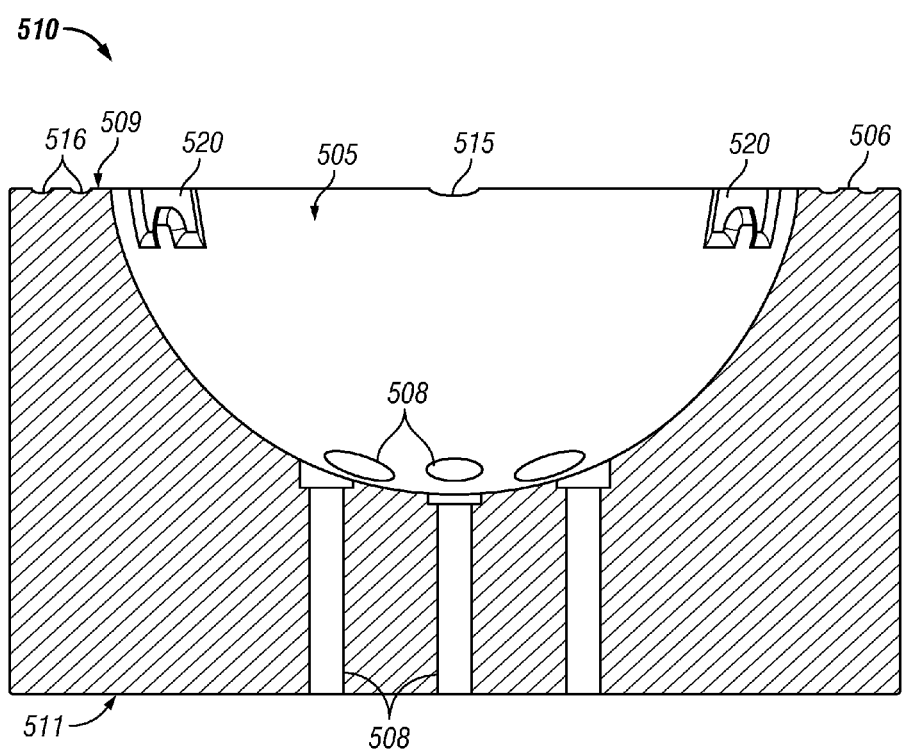
FIG. 14 is a cross sectional view through the mold base of FIG. 13.
Figure 15:
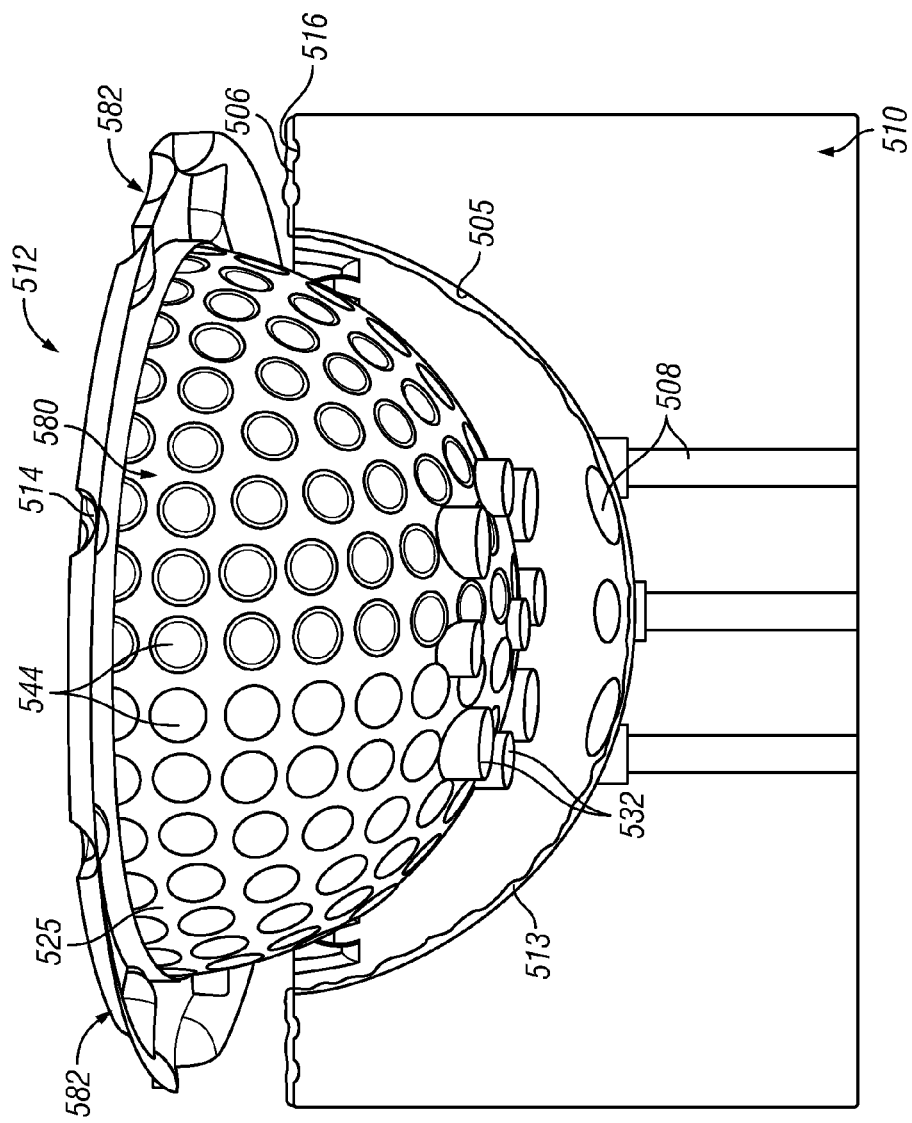
FIG. 15 is a cross sectional view similar to FIG. 14 but illustrating the metal half shell molding layer of FIGS. 10 to 12 being lowered into position in the base.
Figure 16:
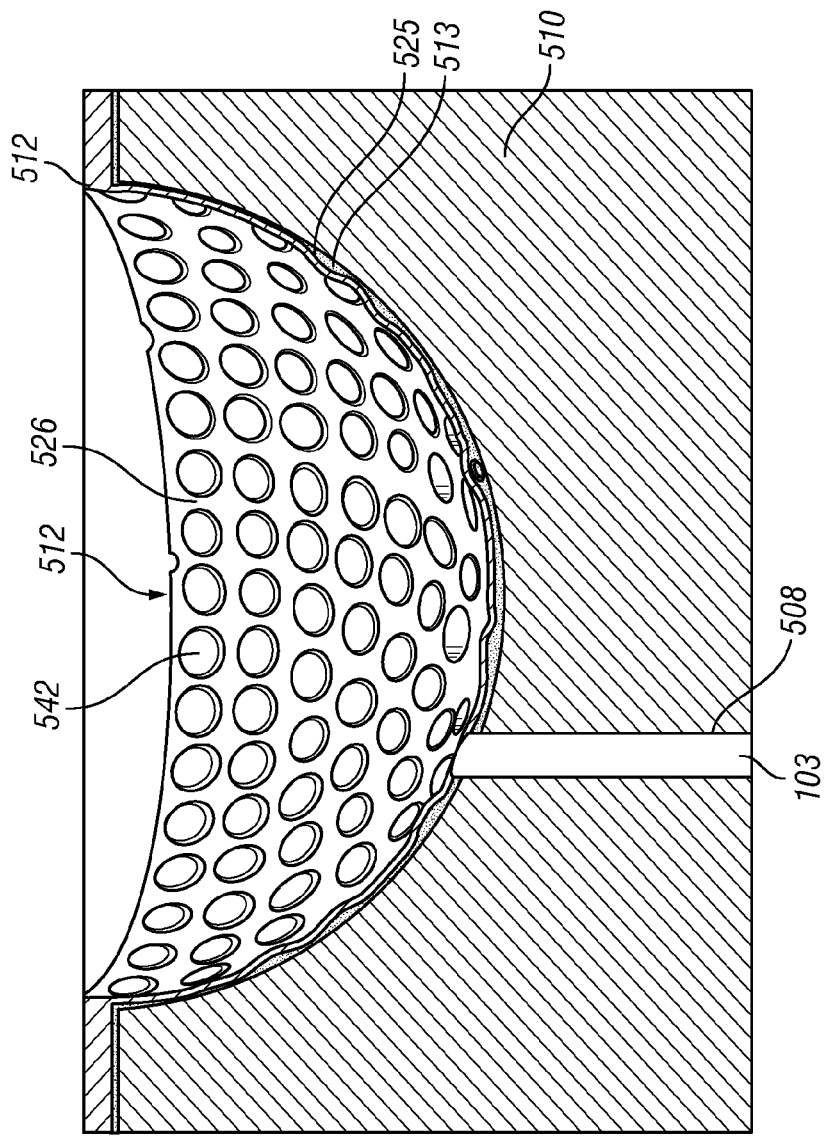
FIG. 16 is a cross-sectional view illustrating the metal half shell positioned with the hemispherical shell portion engaged in the hemispherical cavity in the base.

FIGS. 10 to 18 illustrate one mold cavity half 500 of another embodiment of an injection mold cavity assembly in more detail, as well as various stages of construction of the mold cavity half. The mold cavity in this embodiment is similar to that of FIG. 4, and basically comprises a metal mold cavity base 510, a metal dimpled layer 512 secured over the recessed surface of the base, and an insulating layer 513 of epoxy material or the like between the metal layer 512 and the base 510. FIGS. 10 to 15 illustrate the metal mold half base 510 and metal half shell or metal injection molding surface layer 512 of mold half 500 at various stages in construction of the mold half, while FIGS. 17A to 17D illustrate some alternative arrangements for the vent and core pin receiving bores, and FIGS. 16 and 18 illustrate the fully assembled mold half 500. It will be understood that a second mold cavity half of identical construction is provided to form a complete injection mold cavity, similar to the complete mold cavity 300 surrounding a golf ball core 400 as illustrated in the previous embodiments. The embodiment of FIGS. 10 to 18 is similar to that of FIG. 4, with a continuous insulating layer 513 between the hemispherical regions of the base and metal half shell or layer, and extending part of the way along each gate forming region 514 of the metal shell between the base and metal layer 512.

Figure 10:
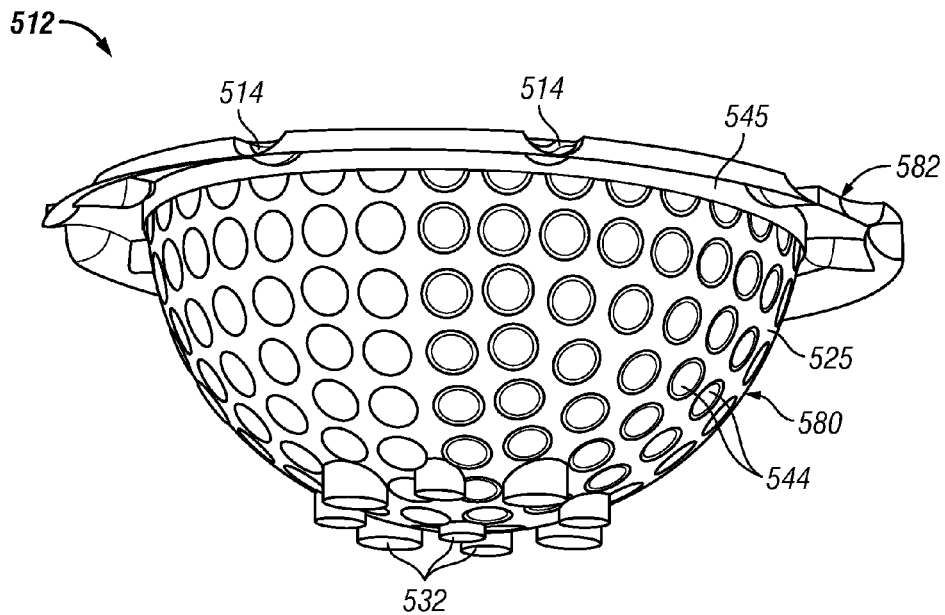
FIG. 10 is a side perspective view of the metal molding surface or half shell used in one mold half of another embodiment of an insulated injection mold cavity assembly.
Figure 11:
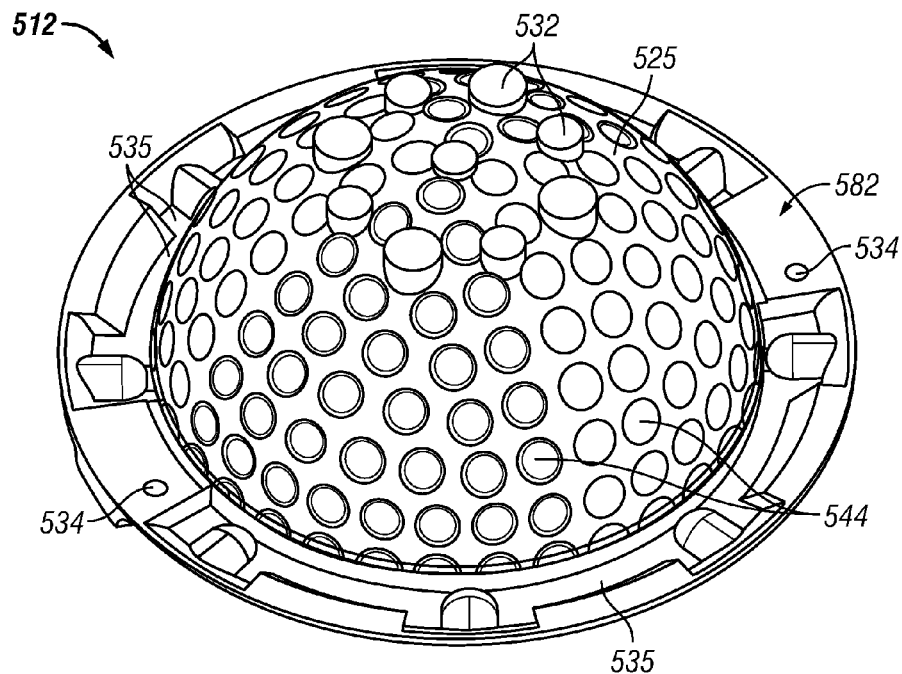
FIG. 11 is a bottom perspective view illustrating the lower surface of the metal molding layer illustrated in FIG. 10.
Figure 13:
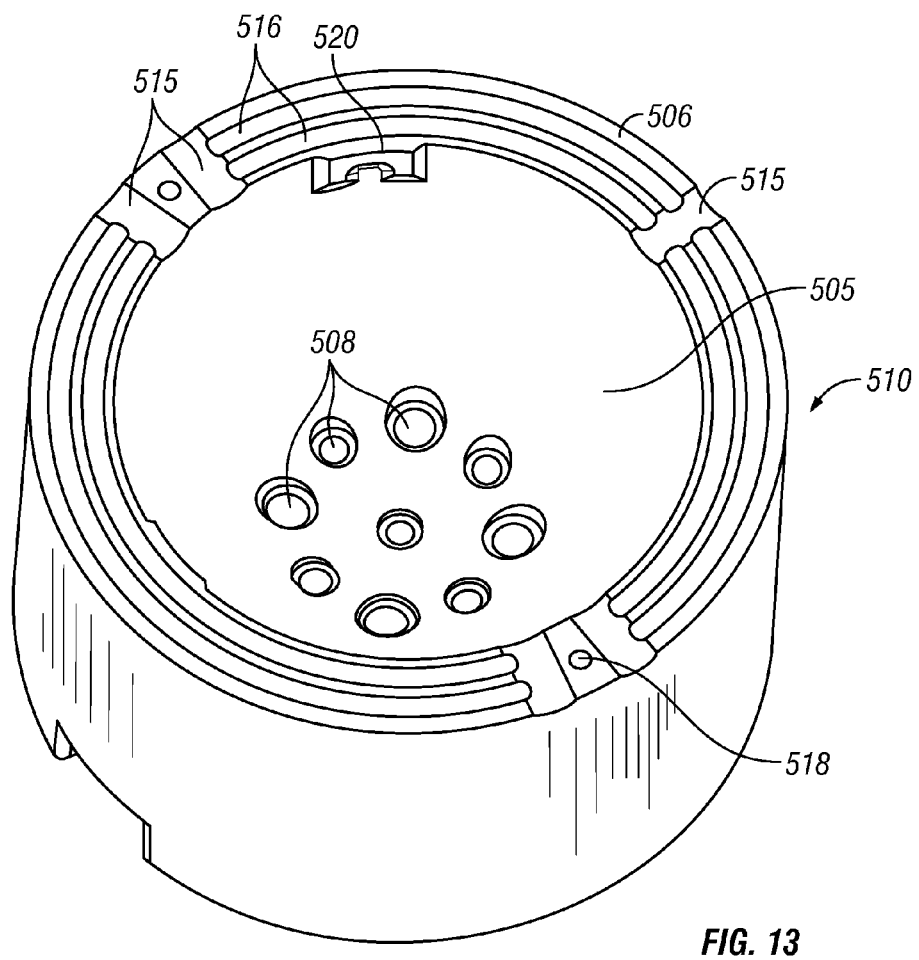
FIG. 13 is a top perspective view of the base of the mold half for receiving the half shell of FIGS. 10 to 12.

FIGS. 10 and 11 illustrate the thin metal dimpled layer or half shell 512 which forms one half of the molding surface surrounding the mold cavity (e.g. cavity 300 in FIG. 4), while FIGS. 13 and 14 illustrate the metal mold cavity half or base 510 in which the metal layer or shell is engaged. As illustrated in FIGS. 13 and 14, each mold cavity half or base 510 comprises a generally cylindrical body having a hemispherical cavity 505 cut in one face 509 which opposes the other mold cavity half in the assembled mold cavity, and core and vent pin bores or holes 508 drilled at selected locations between the opposite face 511 of base 510 and the cavity 505. The position of the core and vent bores 508 in the base of hemispherical cavity 505 in one embodiment is illustrated in FIG. 13, although a greater or lesser number at the same or different positions may be provided in alternative embodiments.

The rim 506 of the base surrounding cavity 505 has a plurality of generally radial grooves 515 comprising epoxy insulation flow channels, and circumferentially extending overflow channels 516 extending between the radial grooves. Cavity alignment pin holes 518 may also be provided in rim 506. Support and centering features or ledges 520 may be provided adjacent the edge of cavity 505 for locating and centering the dimpled metal layer or shell 512 which is described in more detail below. Base 510 has outer annular channels or grooves 522 for receiving O-ring seals and a central large water cooling channel 524, as illustrated in FIG. 10. These channels are omitted for convenience in FIGS. 13 to 16. In one embodiment, cavity 505 is cut in the face of base 510 with appropriate dimensions to accommodate the metal molding layer 512 with 5-10 mil of epoxy insulation between them. This part is cut from a material that has good strength, corrosion resistance and has lower conductivity and/or lower heat capacity than stainless steel, such as a titanium alloy or metal with similar properties. In one example, the titanium alloy Ti-6% Al-4% V was used for base 510.

The metal molding layer or half shell 512 which provides half of the hemispherical molding surface for the outer cover of a golf ball may be of stainless steel or other materials. It may be of titanium or titanium alloy material such as the material described above for the base 510. Any low conductivity metal may be used for molding layer 512. One important factor in choosing a metal material for the molding surface is that the product of the specific gravity and specific heat of the material should be low. It is also important that the material's thermal conductivity is low. Ti-6% Al-2% Sn-4% Zr-2% Mo is another titanium alloy that may be used for molding layer 512. This material has low thermal conductivity, low specific gravity and a relatively low specific heat. Other materials with similarly low thermal conductivity, low specific gravity and relatively low specific heat may alternatively be used.

As illustrated in FIGS. 10, 11, 15, 16 and 18, the metal molding layer or half shell 512 is shaped to form a hemispherical portion 580 surrounded by a peripheral rim 582. The shell 512 has opposite outer and inner surfaces 525 and 526, with the hemispherical portion of the inner surface 526 forming half of the spherical molding surface of the mold assembly, and the outer surface or underside 525 of the shell facing the insulating layer 513 when the mold half is fully assembled, as in FIG. 18. In the illustrated embodiment, the hemispherical portion 580 is formed with a series of raised bumps or protuberances 542 on inner surface 526 and matching indentations 544 on outer surface 525, with the shape and dimension of the protuberances being selected based on the desired golf ball dimple pattern. The undersurface 525 also includes projections or bosses 532 around the center of the hemispherical portion 580 which are designed to extend into the bores 508 in the metal base, as described in more detail below, and which also act as registration points when lowering the shell 512 into the base 510. The peripheral rim 582 of shell 512 is shaped to form half gates 514 which define the injection molding ports 301 when two identical half cavity molds 500 are secured together in face-to-face engagement to form the mold cavity 300. The undersurface of rim 582 has indentations forming flow rings or recesses 535 for receiving insulation material under the rim. The rim also has alignment pin holes 534 (FIG. 11) for alignment with the corresponding holes 518 in base 510 when the parts are assembled In one embodiment, the metal molding layer 512 may be cut from a suitably sized block of material. The block may be undercut from the bottom side to form the hemispherical portion 580 of underside or outer surface 525 of the mold cavity, surrounded by peripheral rim 582 which is seated on the rim 506 of base 510. In one embodiment, surface 525 is cut to match the desired surface pattern of the golf ball layer to be molded, while inner or molding surface 526 is subsequently cut to form the inverse of the desired golf ball layer surface. In the illustrated embodiment, the pattern is a dimple pattern, and indents or dimples 544 are cut in the hemispherical portion of the surface using the desired dimple design. In other embodiments, different surface patterns or no surface patterns at all may be formed in the half shells or metal layers, depending on the desired surface configuration of the golf ball layer. When the layer to be formed is an outer cover layer, the half shells may be configured with any desired surface configuration to form the selected golf ball surface pattern. Where the layer to be formed is an inner or mantle layer, no outer surface pattern is needed and the half shell cavity portions are formed with no surface pattern.

Where the pattern formed on surface 525 is a dimple pattern, the dimple design may comprise dimples of the same diameter and depth or of different diameters and depths, and may include spherical or non spherical dimples as well as truncated dimples, or other dimple shapes, with the dimple configuration including dimples of different shapes or dimples which are of the same shapes, with the number of dimples and dimple shapes and dimensions depending on the desired golf ball surface configuration. As noted above, the cavity portion of the shell in other embodiments may be designed to form other golf ball surface configurations, rather than indented dimples, for example tubular lattice structures, raised bumps, a mixture of indented dimples and bumps, or other surface features and shapes as desired to produce various golf ball surface designs. Additionally, half shells may also be formed with smooth hemispherical or non-hemispherical surfaces having no bumps or indentations, for example where the insulated cavity is to be used to form an interior or mantle layer of a golf ball. Additionally, shells with curved but non-spherical cavity portions may be used to form a non-spherical mantle layer which is thinner and thicker in different regions, for example.

The block in the illustrated embodiment is cut to include projections 532 from surface 525 for the core and vent pins 508. These projections also act as registration points since they engage the bores 508 formed in the base of the injection molding half or cavity. Rim 582 includes alignment openings 534 for cavity alignment pins to align molding layer 512 with the cavity 505 in base 510 when the parts are assembled. The rim 582 is also undercut to form flow rings or recesses 535 for the material forming insulating layer 513, as well as to form the lower surfaces of the injection molding gates or ports 514. The metal layer forming the dimpled cavity is made thicker in a region 545 around the top of the cavity (see FIGS. 10 and 18) to provide extra strength around the edge.

Figure 12:
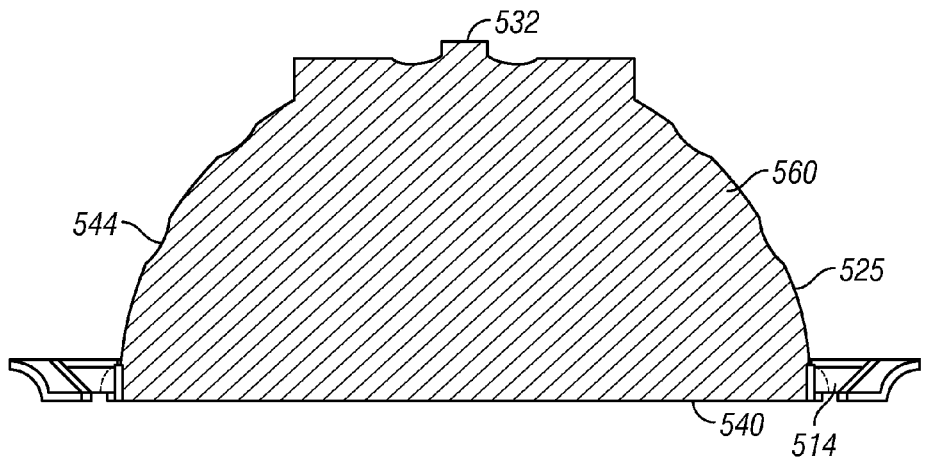
FIG. 12 is a vertical cross-sectional view through a metal part used in forming the metal molding layer or half shell of FIGS. 10 and 11 after cutting of dimples into the outer or undersurface of the molding layer and prior to cutting the dimple pattern into the injection molding surface or inner surface of the molding layer.

The block forming the metal mold surface layer is also cut from the opposite side or face to form the injection mold surface of the mold cavity. This may be done either prior to assembly with the base 510 of the mold half or after the parts 510 and 512 have been assembled together. FIG. 12 is a cross sectional view of the block 560 of metal used to form the shell after the undersurface 525 of the metal molding layer has been cut, and after formation of the injection molding inlets or gates 514 in inner surface 526 of the rim but prior to cutting away material from face 540 to form the hemispherical inner metal molding surface which provides half of the injection molding surface for the outer surface of the golf ball cover layer.

In one embodiment of a method for forming the injection molding assembly or insulated mold cavity, the two parts (base and metal molding layer or shell, or partially formed shell as in FIG. 12) are glued together with an adhesive insulating material that can tolerate the high temperatures of injection molding, such as an epoxy material. In one embodiment of the method, a sufficient amount of a liquid prepolymer plastic material, such as two part epoxy, is applied to the exposed cavity and rim of the base 510 (i.e. the upper surface as seen in FIGS. 13 and 14) to form a coating 513 as illustrated in FIG. 15, and the metal molding layer is placed over the indented surface of the base and lowered so that the hemispherical portion enters cavity 505. FIG. 15 illustrates the layer or half shell lowered partially into the cavity but prior to engagement with the adhesive coating layer 513. Once the metal molding layer 512 is registered with the cavity 505, with projections 532 engaging in the corresponding bores 508 in the base and the undersurface of rim 582 opposing the rim 506 of the base, the polymer or epoxy material 513 filling the gap between the parts is allowed to cure in place, with any excess material flowing out through overflow channels 515. The insulating material acts as the adhesive that permanently bonds the metal molding layer 512 to the base 510 of the cavity half, as illustrated in FIG. 18.

Once the epoxy insulating layer has cured, the part which forms the metal molding layer 512 is machined down from face 540 of FIG. 12 to form the inner or cavity forming face 526 of the shell, with the desired inverse dimples or bumps 542 and other features on face 526 of the metal molding layer, as well as bores through the projections 532 for receiving core and vent pins 546 inserted through bores 508 in the base 510, as illustrated in FIG. 18. Because the cavity parts are very accurately aligned with each other, the inverse dimple features or bumps 542 formed on the exposed face or cavity molding surface 526 of layer 512 are aligned with the dimple features 544 on the underside or face 525 of the metal layer. This makes the metal molding surface of substantially uniform thickness in all areas. The careful alignment also allows the metal molding surface to be cut to a thickness as thin as 0.003-0.007". By making the surface this thin, the heat capacity of the metal molding surface is reduced substantially and thus it draws a smaller amount of heat from the molten plastic, so a thin cover layer on a golf ball may be molded without freeze-off occurring before the part is completed.

The exposed surface 526 of the metal molding layer or shell 512 is also cut on the rim 582 to form one half 514 of each of the injection molding gates or ports, with the other half of each gate formed in the opposing half of the injection molding cavity (see embodiments of FIGS. 3 to 9).

As illustrated in FIG. 18, the insulated area between the metal base and shell of mold half 500 has been expanded to include the portions forming the injection gates 514. The metal available for heat conduction is reduced or minimized in the metal surface layer or shell 512 surrounding the cavity as well as the regions around the injection gates 514. As illustrated in FIG. 13, the holes 508 in each mold base 510 includes five smaller holes for receiving vent pins and four larger holes for receiving core pins. These features work together to improve the ability to mold a thin cover for a golf ball. It becomes exponentially more difficult to mold thinner covers or layers below 0.050" because of the backpressure in trying to force a melt through such a thin cross section. Additional vent holes help to allow forcing of the melted injection molding material into the gap between the golf ball and metal molding surface.

One of the important parts of the cavity design is the manner in which the core and vent pins are configured with respect to the epoxy or insulation layer. FIGS. 17A to 17D illustrate four different alternative configurations for the area around the core and vent pins 103, 104 or 203, 204, with FIG. 17C corresponding to the configuration in the embodiment of FIGS. 10 to 16 and 18. All other parts of the injection molding cavity assembly are the same as in the embodiment of FIG. 4 or FIGS. 10 to 16 and 18, and like reference numbers have been used for like parts as appropriate.

The configuration of FIG. 17A is possibly the easiest for construction purposes because the metal molding surface or layer 512A is adhered to the bottom part of the cavity 505 and core pin or vent pin holes 508A are simply drilled through the cavity assembly after the epoxy or other insulation material 513A has hardened. The potential problem with this design is the pins 103, 104 and 203, 204 in each half of the cavity assembly are moving up and down against the thin molding surface and this area can fatigue or wear away.

In FIG. 17B, projections 570 are formed in the surface of base cavity 505 around each hole 508B and enlarged holes 572 in the metal molding layer 512B engage over the projections. Bores 508B for receiving the core and vent pins extend only through the metal of base 510B, and the epoxy or insulating layer 513B extends into the gap between each projection 570 and the surrounding hole 572. In this alternative, the exposed epoxy 574 in the mold surface 526B could cause problems due to plastic adhesion to the epoxy. The design also requires more work in preparing the cavity base and molding surface so that they properly mate when placed together. A positive feature is that each pin is only in contact with metal.

FIG. 17C illustrates the arrangement described above in connection with FIGS. 10 to 16, in which projections 532 are formed in the undersurface 525 of the metal half shell or mold surface layer 512C, and engage in enlarged portions 558 at the upper ends of bores 508 in the base. In this alternative, the epoxy layer 513C extends into the space 575 between the projections 532 and enlarged portions 558, and excess epoxy is removed from the tight tolerance area. This is probably the easiest configuration for manufacturing purposes.

FIG. 17 D illustrates another alternative which presents fewer issues than FIGS. 17A and 17B with respect to metal-epoxy surface contact in tight tolerance locations. In the alternative of FIG. 17D, the metal half shell or molding surface layer 512D is formed with projections 576 extending from the undersurface of layer 512D through the entire length of the enlarged bores 508D in the base, with a gap between projections 576 and bores 508D which is filled with epoxy material 578. In this case, core and vent pin bores 580 extend through the metal shell layer only, and epoxy material is removed from the core and pin areas entirely.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An injection molding cavity for molding a golf ball layer, comprising:
   a cavity for defining a golf ball layer, the golf ball layer comprising a thickness that corresponds to a space defined by the cavity;
   a metal surface layer surrounding the cavity;
   an insulating layer surrounding the metal surface layer;
   a metal cavity base configured to house the cavity, metal surface layer, and insulating layer;
   the insulating layer having a heat conduction coefficient that is less than the heat conduction coefficient of the metal surface layer and metal cavity base;
   a plurality of bores extending through the base, insulating layer, and metal surface layer;
   vent pins and core pins extending through the bores, the core pins projecting into the cavity and configured to support a golf ball at the center of the cavity to form a cover layer mold cavity between the golf ball and metal surface layer; and
   the metal surface layer has projections extending outwardly from the cavity along at least part of the length of each bore and surrounding a corresponding part of a respective pin.

2. The injection molding cavity of claim 1, wherein the insulating layer is formed from one of the following materials: metal, plastic, ceramic, glass, liquid, gaseous material, or a combination thereof.

3. The injection molding cavity of claim 1, further comprising a metal cavity base configured to house the cavity, metal surface layer, and insulating layer, and wherein the insulating layer acts as an adhesive between the metal surface layer and the metal cavity base.

4. The injection molding cavity of claim 1, wherein the thickness of the metal surface layer is approximately in the range from 0.003-0.3 inches.

5. The injection molding cavity of claim 4, wherein the thickness of the metal surface layer is approximately in the range from 0.003 to 0.007 inches.

6. The injection molding cavity of claim 1, wherein the thickness of the insulating layer is no more than 0.25 inches.

7. The injection molding cavity of claim 6, wherein the thickness of the insulating layer is approximately in the range from 0.002 to 0.08 inches.

8. The injection molding cavity of claim 1, wherein the metal surface layer has an outside diameter such that it fits into the metal cavity base and allows sufficient space for the insulation material to be formed between the metal cavity assembly and the metal surface layer.

9. The injection molding cavity of claim 1, wherein the insulation material comprises a sufficient amount of a liquid pre-polymer plastic material.

10. The injection molding cavity of claim 9, wherein the liquid pre-polymer plastic material is a 2-part epoxy.

11. The injection molding cavity of claim 1, wherein the bores in the insulating layer through which the core pins and vent pins extend have perimeters which are spaced away from the vent pins and core pins.

12. The injection molding cavity of claim 1, wherein the metal surface layer is configured to form a golf ball layer having a thickness of less than about 0.040 inches over at least part of the total surface area of the layer.

13. The injection molding cavity of claim 1, wherein the metal surface layer is configured to form a golf ball cover layer having a selected surface pattern, the surface layer having an inner surface configured with the inverse of the selected surface pattern and an outer surface configured to match the selected surface pattern over at least part of the surface area of the metal surface layer, whereby the metal surface layer is of substantially uniform thickness over at least part of the surface area.

14. An injection molding cavity for molding a golf ball layer, comprising:
   a cavity for defining a golf ball layer, the golf ball layer comprising a thickness that corresponds to a space defined by the cavity;
   a metal surface layer surrounding the cavity;
   an insulating layer surrounding the metal surface layer; and
   the insulating layer comprises a plurality of regions located in certain areas relative to the metal surface layer with gaps in the insulating layer between said regions.

15. The injection molding cavity of claim 14, wherein the cavity is a spherical cavity having polar regions and the plurality of regions are around the polar regions of the cavity only, with no insulating material surrounding said metal surface layer between said polar regions.

16. An injection molding cavity for molding a golf ball layer, comprising:
   a cavity for defining a golf ball layer, the golf ball layer comprising a thickness that corresponds to a space defined by the cavity;
   a metal surface layer surrounding the cavity comprising a peripheral rim;
   an insulating layer surrounding the metal surface layer; and
   at least one injection point that includes an injection gate formed at the peripheral rim, and wherein the insulating layer extends under at least part of the peripheral rim of the metal surface layer at the injection gate.

17. An injection molding cavity assembly for molding a thin layer or a low-flow material layer of a golf ball, comprising:
   a cavity for defining a golf ball layer, the golf ball layer comprising a thickness that corresponds to a space defined by the cavity;
   a metal surface layer surrounding the cavity;
   a metal cavity base configured to house the cavity, metal surface layer, and insulating layer; and
   an insulating layer between the base and the metal surface layer, the insulating layer being non-continuous and comprising a plurality of insulating regions and open regions located in certain areas relative to the metal surface layer.

18. The injection molding cavity of claim 17, wherein the insulating layer comprises a material that has a heat conduction coefficient that is less than a heat conduction coefficient of the metal surface layer.

19. The injection molding cavity of claim 17, wherein the insulating layer comprises a heat conduction coefficient that is less than a heat conduction coefficient of the metal cavity base assembly.

20. The injection molding cavity of claim 17, wherein the insulating layer is formed from a one of the following materials: metal, plastic, ceramic, glass, liquid, gaseous material, or a combination thereof.

21. The injection molding cavity of claim 17, wherein the insulating layer acts as an adhesive between the metal surface layer and the metal cavity base assembly.

22. The injection molding cavity of claim 17, wherein the thickness of the metal surface layer is approximately in the range from 0.003-0.3 inches.

23. The injection molding cavity of claim 17, wherein the metal surface layer has an outside diameter such that it fits into the metal cavity base assembly and allows sufficient space for the insulation material to be formed between the metal cavity base assembly and the metal surface layer.

24. The injection molding cavity of claim 17, wherein the insulation material comprises a sufficient amount of a liquid pre-polymer plastic material.

25. The injection molding cavity of claim 24, wherein the liquid pre-polymer plastic material is a 2-part epoxy.

26. The injection molding cavity of claim 17, wherein the plurality of insulating regions are around the polar regions of the cavity.

27. The injection molding cavity of claim 26, further comprising vent pins and core pins, wherein the plurality of insulating regions are spaced away from the vent pins, the core pins, or both.

28. The injection molding cavity of claim 17, further comprising an injection point that includes an injection gate, and wherein the insulating layer extends under the injection gate.

29. The injection molding cavity of claim 17, wherein the thickness of the golf ball layer is less than about 0.040 inches over at least a major portion of the layer.

30. The injection molding cavity of claim 17, wherein the metal surface layer forming the cavity has an inner surface comprising a reverse dimple formation and an outer surface comprising a dimple formation matching the reverse dimple formation, whereby the thickness of the metal surface layer is substantially constant over at least a major portion of the cavity.

31. The injection molding cavity of claim 30, wherein the insulating layer comprises two half shells each forming a respective half of the cavity, each half shell having a hemispherical portion and a peripheral rim which is secured to the opposing peripheral rim of the other cavity half.

32. An injection molding assembly for molding a golf ball cover or mantle layer, comprising:
- a cavity for defining a golf ball layer, the golf ball layer comprising a thickness that corresponds to a space defined by the cavity;
- a metal surface layer surrounding the cavity;
- an insulating layer surrounding the metal surface layer, the insulating layer comprising a thickness;
- a metal cavity base assembly surrounding the insulating layer, the insulating layer having a heat conduction coefficient that is less than a heat conduction coefficient of the metal cavity base assembly and a heat conduction coefficient of the metal surface layer;
- the metal cavity base, insulating layer, and metal surface layer together forming two opposing mold halves each surrounding a respective half of the mold cavity;
- the metal cavity base of each mold half having a peripheral rim surrounding a hemispherical half of the cavity and secured to the opposing peripheral rim of the other mold half; and
- the metal surface layer of each mold half having a hemispherical portion surrounding the cavity and a peripheral rim surrounding the hemispherical portion and extending over the peripheral rim of the base of the mold half, the peripheral rim of the metal surface layer being thicker than the hemispherical portion of the metal surface layer.

33. The injection molding cavity of claim 32, wherein the insulating layer is formed from a one of the following materials: metal, plastic, ceramic, glass, liquid, gaseous material, or a combination thereof.

34. The injection molding cavity of claim 32, wherein the insulating layer comprises an inverse dimple pattern.

35. The injection molding cavity of claim 32, wherein the thickness of the golf ball layer is less than about 0.40 inches over at least a major portion of the golf ball layer.

36. The injection molding cavity of claim 32, wherein the peripheral rim of the metal surface layer of each mold half has a plurality of grooves forming injection molding ports with grooves in the peripheral rim of the metal surface layer of the opposing mold half.

37. The injection molding cavity of claim 36, wherein the insulating layer extends between the peripheral rims of the base and shell in each mold half at least in the region of the injection molding ports.

* * * * *